(12) United States Patent
Mercado et al.

(10) Patent No.: US 9,159,353 B2
(45) Date of Patent: Oct. 13, 2015

(54) PLASMA POLISH FOR MAGNETIC RECORDING MEDIA

(75) Inventors: Mark F. Mercado, Morgan Hill, CA (US); Mohammad T. Mirzamaani, San Jose, CA (US); Kai Tang, San Jose, CA (US); Qi-Fan Xiao, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/472,854

(22) Filed: May 16, 2012

(65) Prior Publication Data

US 2013/0309526 A1    Nov. 21, 2013

(51) Int. Cl.
*G11B 5/82* (2006.01)
*G11B 5/84* (2006.01)
*G11B 5/72* (2006.01)

(52) U.S. Cl.
CPC ............... *G11B 5/8408* (2013.01); *G11B 5/72* (2013.01)

(58) Field of Classification Search
USPC ......... 427/112, 113, 127, 128, 129, 130, 131, 427/132
See application file for complete search history.

(56) References Cited

U.S. PATENT DOCUMENTS

| | | | |
|---|---|---|---|
| 5,815,343 A | 9/1998 | Ishikawa et al. | |
| 6,095,160 A | 8/2000 | Chu | |
| 6,103,367 A | 8/2000 | Weir et al. | |
| 6,210,819 B1 | 4/2001 | Lal et al. | |
| 7,586,830 B2 | 9/2009 | Yasui et al. | |
| 7,616,404 B2 | 11/2009 | Suwa et al. | |
| 7,943,193 B2 | 5/2011 | Endou et al. | |
| 8,110,298 B1 | 2/2012 | Choe et al. | |
| 8,202,636 B2 | 6/2012 | Choe et al. | |
| 2001/0028963 A1* | 10/2001 | Naoe et al. | 428/694 BN |
| 2002/0040848 A1* | 4/2002 | Sakurai et al. | 204/192.38 |
| 2003/0162057 A1* | 8/2003 | Matsunuma et al. | 428/694 TS |
| 2004/0161578 A1 | 8/2004 | Chour et al. | |
| 2004/0175510 A1* | 9/2004 | Hattori et al. | 427/454 |
| 2004/0264070 A1* | 12/2004 | Lee et al. | 360/324.11 |
| 2005/0181239 A1* | 8/2005 | Ma et al. | 428/835 |
| 2006/0086606 A1* | 4/2006 | Honda et al. | 204/192.2 |
| 2008/0024041 A1* | 1/2008 | Shibata | 310/340 |
| 2008/0074784 A1* | 3/2008 | Aoyama | 360/125.02 |
| 2008/0174913 A1* | 7/2008 | Sato | 360/135 |

(Continued)

FOREIGN PATENT DOCUMENTS

JP    02-208827 A    8/1990

OTHER PUBLICATIONS

HDI Technology for Perpendicular Magnetic Recording Media, http://www.fujielectric.com/company/tech/pdf/57-02/FER-57-2-051-2011.pdf.

(Continued)

*Primary Examiner* — Michael Cleveland
*Assistant Examiner* — Tabassom Tadayyon Eslami
(74) *Attorney, Agent, or Firm* — Duft Bornsen & Fettig LLP (57) ABSTRACT

Fabrication methods for magnetic recording media that use a plasma polish are disclosed. For one exemplary method, a film of a magnetic recording medium is deposited, and a top surface of the film is polished utilizing a plasma formed by a noble gas to smoothen the top surface of the film. A subsequent layer is then deposited onto the polished top surface of the film. A top surface of the subsequent layer has a reduced roughness by being deposited on the polished top surface of the film.

10 Claims, 5 Drawing Sheets

(56) References Cited

U.S. PATENT DOCUMENTS

| | | | |
|---|---|---|---|
| 2009/0268599 A1* | 10/2009 | Murakami | 369/275.4 |
| 2010/0092802 A1 | 4/2010 | Ma et al. | |
| 2010/0190036 A1 | 7/2010 | Komvopoulos et al. | |
| 2011/0293967 A1* | 12/2011 | Zhang et al. | 428/827 |
| 2012/0012554 A1* | 1/2012 | Bian et al. | 216/22 |
| 2012/0034135 A1* | 2/2012 | Risby | 422/186.03 |
| 2013/0094109 A1* | 4/2013 | Marchon et al. | 360/244 |
| 2013/0114165 A1 | 5/2013 | Mosendz et al. | |
| 2013/0309526 A1 | 11/2013 | Mercado et al. | |
| 2014/0065444 A1* | 3/2014 | Rose Dit Rose | 428/814 |
| 2014/0168817 A1 | 6/2014 | Choe et al. | |
| 2014/0231385 A1 | 8/2014 | Guo et al. | |

OTHER PUBLICATIONS

Probing the Role of an Atomically Thin SiN Interlayer on the Structure of Ultrathin Carbon Films, http://www.nature.com/srep/2014/140521/srep05021/full/srep05021.html?message-global=remove.

Hui-Chia Su. A Comparison Between X-ray Reflectivity and Atomic Force Microscopy on the Characterization of a Surface Roughness, Chinese Journal of Physics, vol. 50, No. 2, Apr. 2012, pp. 291-300.

* cited by examiner

PLASMA POLISH FOR MAGNETIC RECORDING MEDIA

FIELD OF THE INVENTION

The invention is related to the field of magnetic disks, and in particular, to fabricating magnetic recording media.

BACKGROUND

Many computer systems use magnetic disk drives for mass storage of information. Magnetic disk drives typically include one or more sliders having a read head and a write head. An actuator/suspension arm holds the slider above the surface of a magnetic disk. When the disk rotates, an air flow generated by the rotation of the disk causes an air bearing surface (ABS) side of the slider to fly to a particular height above the disk. As the slider flies on the air bearing, a voice coil motor (VCM) moves the actuator/suspension arm to position the read/write head over selected tracks of the disk. The read/write head may then read data from or write data to the tracks of the disk.

A conventional disk includes data fields where the actual data is stored. In the data fields, the magnetic surface of the disk is divided into small magnetic regions, each of which is used to encode a single binary bit of information. The magnetic regions include a few dozen magnetic grains forming a magnetic dipole, which generates a highly localized magnetic field. The write head magnetizes a magnetic region by generating a strong local magnetic field to store a bit of data within the magnetic region during a write process. The read head senses the magnetic dipole of the magnetic region to read the bit of data during a read process.

As the areal bit density of the disk increases, the magnetic regions encoding the bit data become smaller. This may reduce the read signal generated in the read head. One solution to improve the read signal is to reduce the thickness of the carbon overcoat that is typically applied to the disk for protection. The carbon overcoat is a non-magnetic layer applied to the magnetic films used store the bit data on the disk. Thus, reducing the overcoat thickness potentially reduces the relative distance between the ABS side of the slider and the magnetic films, which improves the read signal generated in the read head. However, as the overcoat becomes thinner, the corrosion resistance of the disk may degrade, especially if the overcoat is rough.

Another solution to improving the read signal is to reduce the clearance between the ABS side of the slider and the top surface of the disk. However, one consequence of a reduced clearance between the slider and the top surface of the disk is head-to-disk contact, which is undesirable. Head-to-disk contact occurs when the ABS side of the slider makes contact with the disk. Head-to-disk contact may cause damage to the slider, the disk, or both. It therefore remains an ongoing challenge to increase the areal bit density on the disk to improve the storage capacity of disk drive systems.

SUMMARY

Embodiments provided herein include improved fabrication of recording media where the top surface of a film is polished utilizing a plasma formed from a noble gas. Polishing the top surface of the film reduces the roughness of the top surface, and therefore, reduces the resulting roughness of one or more subsequent layers deposited on the film. For example, if a top surface of a magnetic recording layer is polished using the plasma, then a carbon overcoat applied to the magnetic recording layer will have a smoother top surface. A smoother carbon overcoat on the disk improves the clearance between the ABS side of the slider and the disk. Also, a smoother carbon overcoat on the disk improves the corrosion resistance of the disk, and therefore, the carbon overcoat may be made thinner without sacrificing the corrosion resistance of the disk.

One embodiment comprises a method of fabricating a magnetic recording disk. According to the method, a film for the magnetic recording disk is deposited. A top surface of the film is then polished utilizing a plasma formed by a noble gas to smoothen the top surface. A subsequent layer is then deposited onto the polished top surface of the film. Because the subsequent layer is deposited on the polished top surface of the film, the roughness of the top surface of the subsequent layer is reduced.

Another embodiment comprises a method of fabricating a magnetic recording disk. According to the method, a film for the magnetic recording disk is deposited. A top surface of the film is then polished utilizing a plasma formed by a noble gas to smoothen the top surface. In the polish process, a negative bias voltage is applied to the film which generates an electric field accelerating positive ions toward the film. A subsequent layer is then deposited onto the polished top surface of the film. Because the subsequent layer is deposited on the polished top surface of the film, a roughness of the top surface of the subsequent layer is reduced.

Another embodiment comprises a method of fabricating a magnetic recording disk. According to the method, a film for the magnetic recording disk is deposited. A top surface of the film is then polished utilizing a plasma formed by a noble gas to smoothen the top surface. In the polish process, a negative bias voltage is applied to the film which generates an electric field accelerating positive ions toward film. Also, a relatively high flow rate of noble gas is employed to increase the density of positive ions in the plasma and to enhance the bombardment of the positive ions on the surface of the film. A subsequent layer is then deposited onto the polished top surface of the film. Because the subsequent layer is deposited on the polished top surface of the film, the roughness of a top surface of the subsequent layer is reduced.

Another embodiment comprises a method of fabricating a magnetic recording disk. According to the method, a magnetic recording layer is deposited. A top surface of the magnetic recording layer is polished utilizing a plasma formed by a noble gas to smoothen the top surface. In the polish process, a negative bias voltage is applied to the magnetic recording layer which generates an electric field accelerating positive ions toward the magnetic recording layer. A carbon overcoat is then deposited on the polished top surface of the magnetic recording layer. Because the carbon overcoat is deposited on the polished top surface of the magnetic recording layer, the roughness of a top surface of the carbon overcoat is reduced.

Another embodiment comprises a method of fabricating a magnetic recording disk. According to the method, a magnetic recording layer is deposited. A top surface of the magnetic recording layer is polished utilizing a plasma formed by a noble gas to smoothen the top surface. In the polish process, a negative bias voltage is applied to the magnetic recording layer which generates an electric field accelerating positive ions toward the magnetic recording layer. Also, a relatively high flow rate of noble gas is employed to increase the density of positive ions in the plasma and to enhance the bombardment of the positive ions on the surface of the magnetic recording layer. A carbon overcoat is then deposited on the polished top surface of the magnetic recording layer. Because the carbon overcoat is deposited on the polished top surface of the magnetic recording layer, the roughness of the top surface of the carbon overcoat is reduced.

Another embodiment comprises a method of fabricating a magnetic recording disk. According to the method, one of a magnetic recording sublayer, a magnetic underlayer or a non-magnetic underlayer is deposited, such as onto a substrate, with or without a seed layer, etc. A top surface of the magnetic recording sublayer, the magnetic underlayer or the non-magnetic underlayer is polished utilizing a plasma formed from a noble gas to smoothen the top surface. In the polish process, a negative bias voltage is applied to the magnetic recording sublayer, the magnetic underlayer or the non-magnetic underlayer which generates an electric field accelerating positive ions toward the magnetic recording sublayer, the magnetic underlayer or the non-magnetic underlayer. A magnetic recording layer is then fabricated onto the polished top surface of the magnetic recording sublayer, the magnetic underlayer or the non-magnetic underlayer. Because the magnetic recording layer is deposited on the polished top surface, the roughness of a top surface of the magnetic recording layer is reduced.

Another embodiment comprises a method of fabricating a magnetic recording disk. According to the method, one of a magnetic recording sublayer, a magnetic underlayer or a non-magnetic underlayer is deposited, such as onto a substrate, with or without a seed layer, etc. A top surface of the magnetic recording sublayer, the magnetic underlayer or the non-magnetic underlayer is polished utilizing a plasma formed from a noble gas to smoothen the top surface. In the polish process, a negative bias voltage is applied to the magnetic recording sublayer, the magnetic underlayer or the non-magnetic underlayer which generates an electric field accelerating positive ions toward the magnetic recording sublayer, the magnetic underlayer or the non-magnetic underlayer. Also, a relatively high flow rate of noble gas is employed to increase the density of positive ions in the plasma and to enhance the bombardment of the positive ions on the surface of the magnetic recording sublayer, the magnetic underlayer or the non-magnetic underlayer. A magnetic recording layer is then fabricated onto the polished top surface. Because the magnetic recording layer is deposited on the polished top surface, the roughness of the top surface of the magnetic recording layer is reduced.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
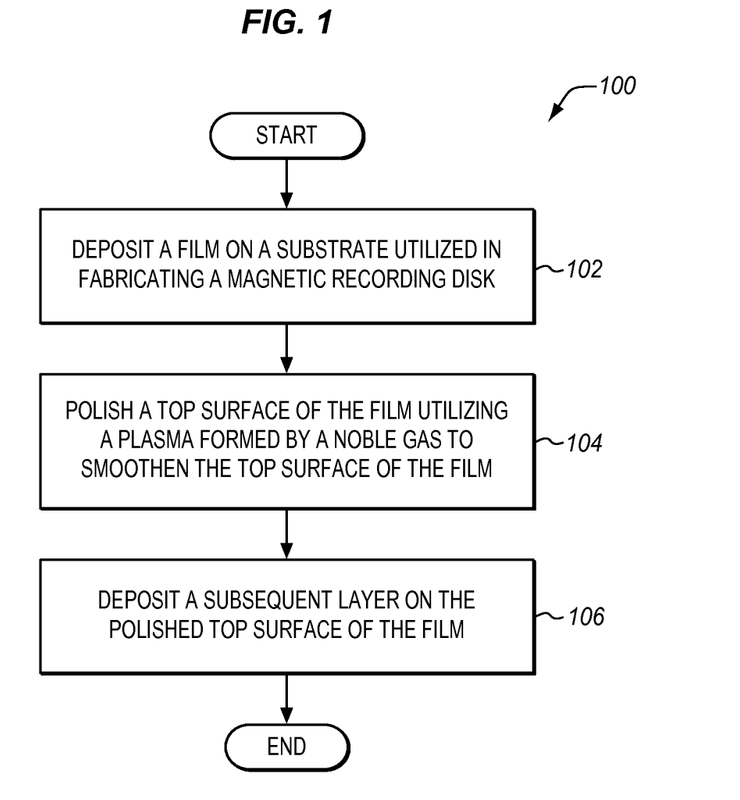
FIG. 1 is a flow chart illustrating a method of fabricating a magnetic recording disk in an exemplary embodiment.

FIG. 1 is a flow chart illustrating a method 100 of fabricating a magnetic recording disk in an exemplary embodiment. Method 100 may be performed in one or more fabrication modules that are used to fabricate magnetic recording disks. The steps of the flowcharts provided herein are not all inclusive and other steps, not shown, may be included. Further, the steps may be performed in an alternative order.

Figure 2:
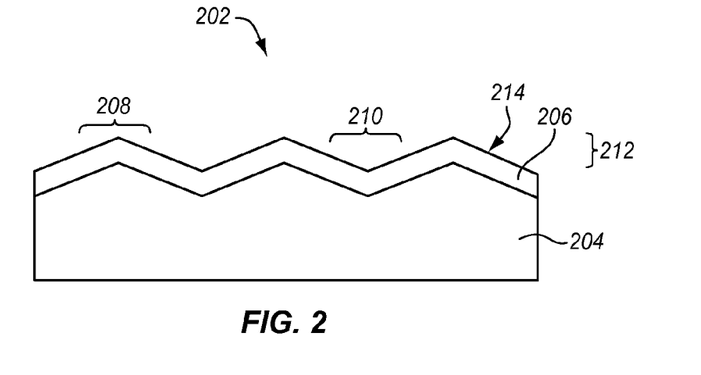
FIG. 2 is a cross-sectional view illustrating a portion of a disk after depositing a film according to a step of the method of FIG. 1 in an exemplary embodiment.

Step 102 comprises depositing a film of a magnetic recording disk. Although not shown, the film may be deposited on a substrate or on another film of the disk that was previously deposited. Some examples of the film are a soft magnetic underlayer (SUL), a magnetic underlayer, a non-magnetic underlayer, a magnetic recording sublayer, a magnetic recording layer, a magnetic cap layer, etc. FIG. 2 is a cross-sectional view illustrating a portion of a disk after depositing a film 206 onto a substrate 204 in an exemplary embodiment. The portion of the disk illustrated in FIG. 2 and the other figures is a magnified view to show the roughness of the surface of films. As shown in FIG. 2, the top surface 214 of film 206 is relatively rough after the deposition step. Top surface 214 has a number of peaks 208 and valleys 210 that modulate a height 212 of top surface 214. During the fabrication process for disk 202, subsequent layer(s) that are deposited onto film 206 will inherit some or all of the roughness of film 206 during the deposition process, and therefore will also not be particularly smooth. This may be problematic for a number of reasons. First, it is desirable to make the top surface of disk 202 as smooth as possible. A smooth top surface on disk 202 improves the clearance between a read/write head (not shown in the FIGS.) and the magnetic recording disk, which allows the read/write head to fly closer to disk 202. The second reason to make the top surface of disk 202 as smooth as possible is related to the corrosion resistance of disk 202. Rough surfaces tend to corrode faster than smooth surfaces because of an increase in the amount of surface area that a rough surface presents to an environment. In order to achieve some measure of corrosion resistance, disk fabricators desire smoother surfaces, or fabricate thicker protective layers in order to reduce the corrosion rate of the recording media. However, thick protective layers are typically non-magnetic carbon-like layers (such as Diamond-Like Carbon, or DLC) that act to separate the read/write head from the magnetic layers used to store bit data on the disk. As this separation increases, which is also referred to as the magnetic spacing, the read signal (for a constant magnetic region size) decreases. This is undesirable and problematic because as the bit density of magnetic recording media increases, the number of magnetic grains (and therefore the size of the magnetic regions used to store data) decreases.

Figure 3:
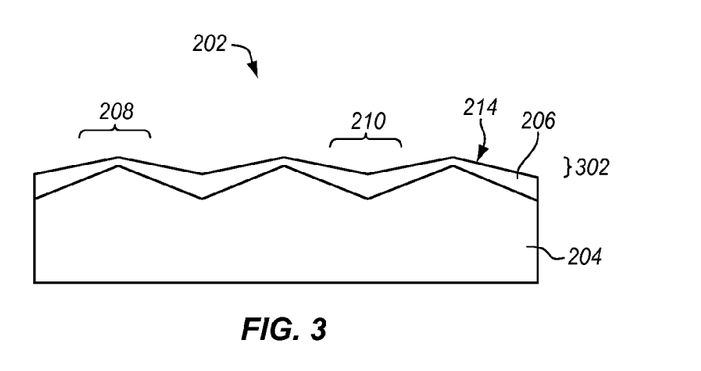
FIG. 3 is a cross-sectional view illustrating a portion of a disk after polishing a top surface of a film according to a step of the method of FIG. 1 in an exemplary embodiment.

Step 104 (see FIG. 1) comprises polishing top surface 214 of film 206 using a plasma formed by a noble gas. FIG. 3 is a cross-sectional view illustrating a portion of disk 202 after polishing top surface 214 of film 206 in according to step 104 of the method of FIG. 1 in an exemplary embodiment. FIG. 3 illustrates how the roughness of top surface 214 is reduced as compared to the roughness of top surface 214 illustrated in FIG. 2 after the film 206 was first deposited. During the polishing process, a plasma is formed proximate to film 206 from one or more noble gases, such as Argon, Krypton, Neon, etc. The atoms of the noble gas, now ionized, accelerate toward disk 202 and knock atoms from film 206 loose. This tends to reduce the roughness of top surface 214 by decreasing/reducing irregularities or unevenness of top surface 214, as illustrated by height 302.

Figure 4:
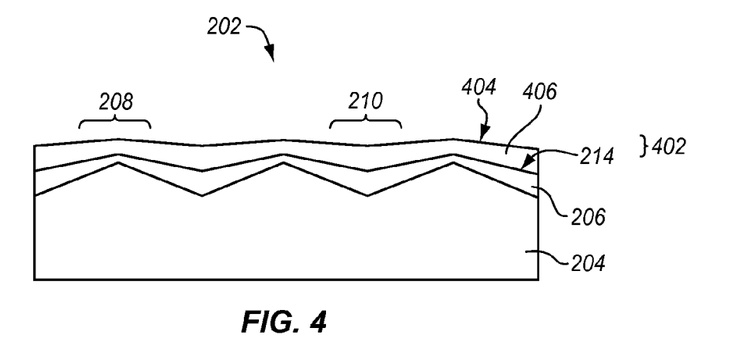
FIG. 4 is a cross-sectional view illustrating the disk after depositing a subsequent layer on a polished top surface of a film according to a step of the method of FIG. 1 in an exemplary embodiment.

Step 106 comprises depositing a subsequent layer on the polished top surface 214 of film 206. FIG. 4 is a cross-sectional view illustrating disk 202 after depositing subsequent layer 406 on a polished top surface of film 206 according to step 106 of the method of FIG. 1 in an exemplary embodiment. After depositing layer 406, top surface 214 becomes an interfacial layer between layer 406 and film 206. During the deposition process, layer 406 grows on top of film 206 and therefore, has a smoother surface (e.g., illustrated by height 402) to form on due to the plasma polishing process applied to film 206. As a result, the top surface 404 of layer 406 is likewise smoother. Because top surface 404 of layer 406 is smoother, the corrosion resistance of layer 406 increases. Also, subsequent layers deposited on layer 406 will grow on a smoother surface, and therefore may inherit this smoothness for surface(s) grown on layer 406.

Figure 5:
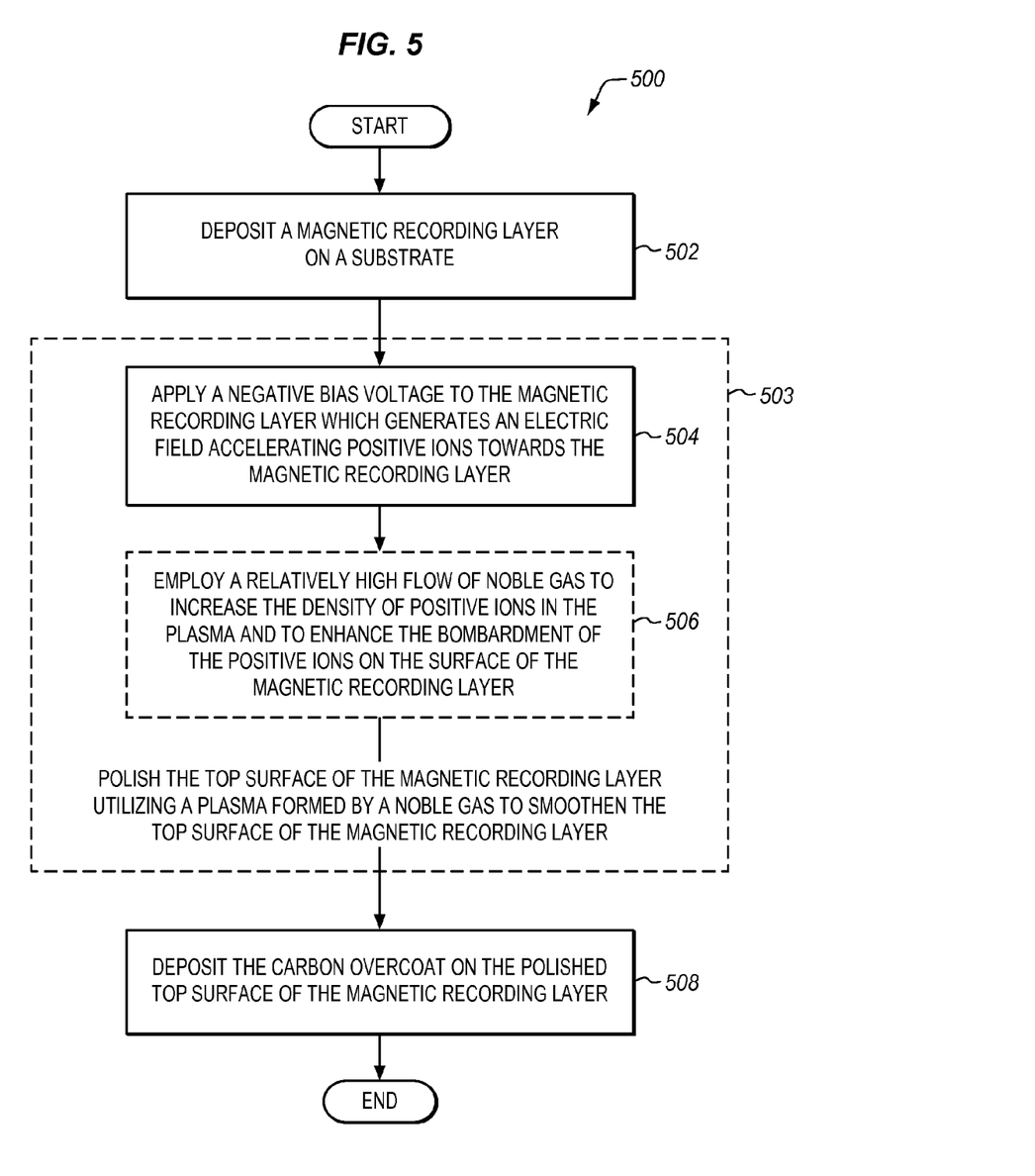
FIG. 5 is a flow chart illustrating another method of fabricating a magnetic recording disk in an exemplary embodiment.
Figure 6:
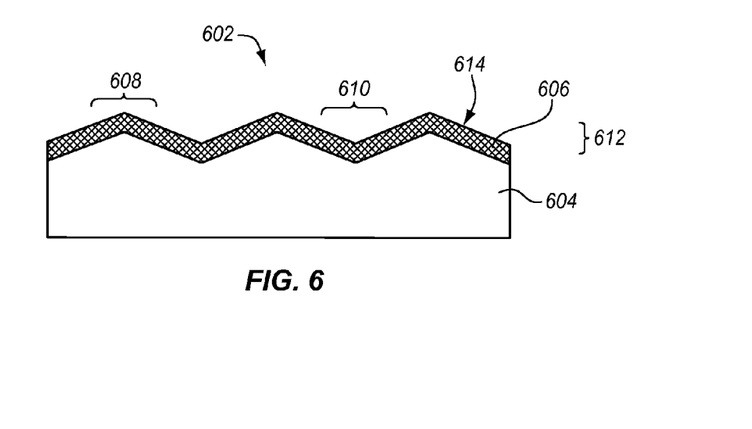
FIG. 6 is a cross-sectional view illustrating a portion of a disk after depositing a magnetic recording layer according to a step of the method of FIG. 5 in an exemplary embodiment.

FIG. 5 is a flow chart illustrating another method of fabricating a magnetic recording disk in an exemplary embodiment. Step 502 comprises depositing a magnetic recording layer utilized to fabricate magnetic recording disk. FIG. 6 is a cross-sectional view illustrating a portion of a disk 602 after depositing a magnetic recording layer 606 onto a substrate 604 according to step 502 of the method of FIG. 5 in an exemplary embodiment. Typically, recording layer 606 is a stack of multiple magnetic films that form magnetic regions for storing bits of data. As shown in FIG. 6, the top surface 614 of recording layer 606 is not smooth after being deposited. Top surface 614 has a number of peaks 608 and valleys 610 that modulate a height 612 of top surface 614. In order to protect recording layer 606 from corrosion and damage, a carbon overcoat is typically applied to recording layer 606. With a rough magnetic recording layer 606, depositing a carbon overcoat on recording layer 606 results in rough carbon overcoat for disk 602.

Figure 7:
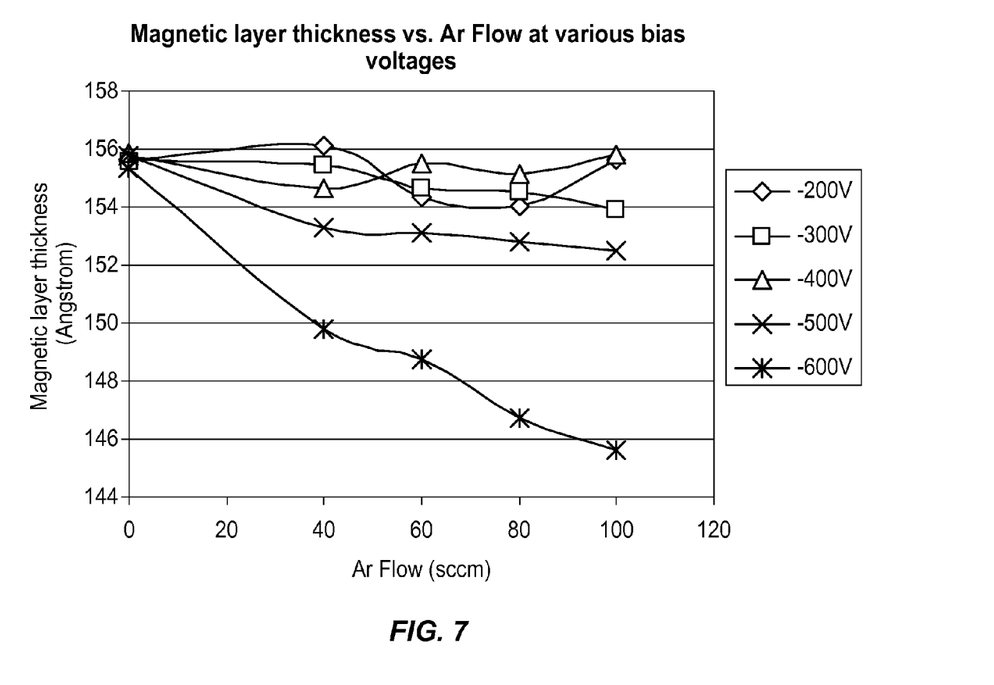
FIG. 7 is a graph illustrating a magnetic layer thickness vs. Argon flow rate at various bias voltages as determined during testing.

Steps 504 and 506 comprise steps for performing a polishing process 503 on the top surface 614 of magnetic recording layer 606 using a plasma. Step 504 and 506 are additional exemplary details of the polishing process described previously for step 104 (see FIG. 1). During the polishing process, noble gas atoms (e.g., Krypton, Argon, Neon, etc.) bombard the surface of magnetic recording layer 606 and knock material off of magnetic recording layer 606. More particularly, atoms near peaks 608 are more exposed and available for polishing. Step 504 comprises applying a negative bias voltage to magnetic recording layer 606 which generates an electric field accelerating positive ions toward magnetic recording layer 606. For example, disk 202 may be inserted into a Direct Current (DC) magnetron sputtering station, and a DC voltage of between about negative 400 and negative 600 volts applied to recording layer 606 relative to a sputter shield. Step 506 is an optional step for method 500. Step 506 comprises employing a relatively high flow of noble gas to increase the density of the positive ions in the plasma. The increase in density also enhances the bombardment of the positive ions on the surface of the magnetic recording layer. In some embodiments, the flow rate of the noble gas is above about forty Standard Cubic Centimeters per Minute (SCCM). FIG. 7 is a graph illustrating a magnetic layer thickness vs. Argon flow rate at various bias voltages as determined during testing. FIG. 7 illustrates that the magnetic layer thickness is substantially unchanged at bias voltages between −500 V and −200 V regardless of the Argon flow rate. However, when the bias voltage of about −600 V is applied, there is a strong flow-dependent reduction of the magnetic layer thickness, thus allowing fabricators to control the polishing rate of a magnetic layer by varying the Argon flow rate at a −600V bias voltage. The optimum negative bias can be selected based on how much film needs to be removed to reach the desired smoothness and the specific geometry of the sputtering station used for the polish process. It can be a negative bias with absolute value greater than 600V as well. The sputtering targets used in the DC magnetron station for the polish process can have elements such as Co, Pt, Cr, B, Ta, Ru, C, and any combination of these elements. Some examples of the target compositions are CoPtCrB, Cr, CrB, Ta, Ru, C. In addition to the noble gas, $C_2H_2$, $C_2H_4$, $H_2$, $O_2$, and $N_2$ may be injected to the station during the polish process also.

Figure 8:
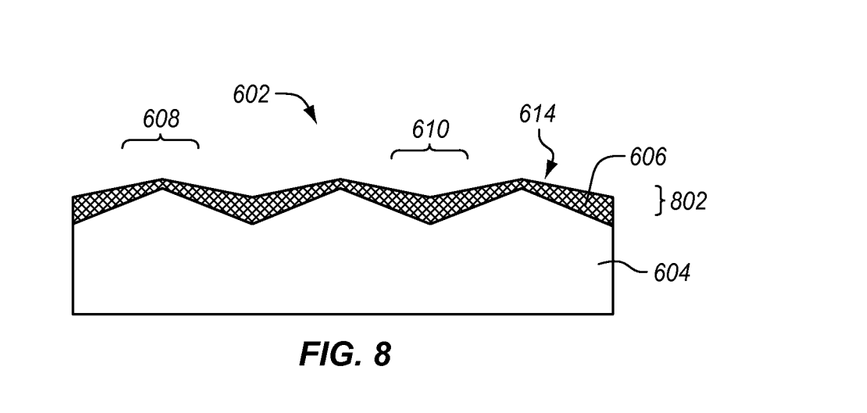
FIG. 8 is a cross-sectional view illustrating a portion of a disk after polishing a top surface of a recording layer according to a step of the method of FIG. 5 in an exemplary embodiment.
Figure 9:
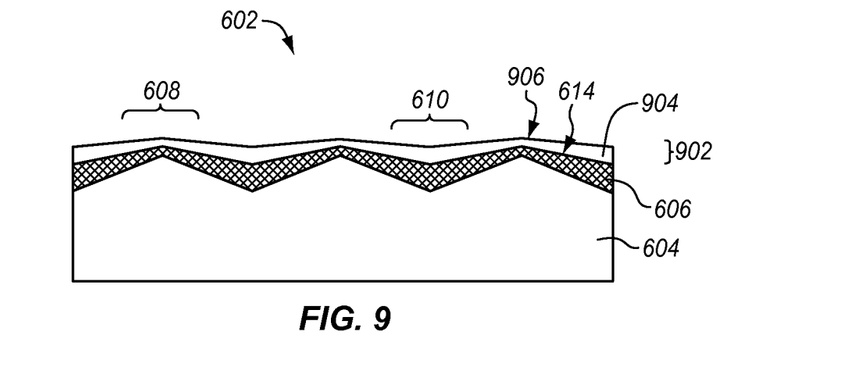
FIG. 9 is a cross-sectional view illustrating a portion of a disk after depositing carbon overcoat on a polished to surface of a recording layer according to a step of the method of FIG. 5 in an exemplary embodiment.

FIG. 8 is a cross-sectional view illustrating a portion of disk 602 after polishing top surface 614 of recording layer 606 according to step 506 of the method of FIG. 5 in an exemplary embodiment. Step 508 of FIG. 5 comprises depositing a carbon overcoat on the polished top surface 614 of recording layer 606. FIG. 9 is a cross-sectional view illustrating a portion of disk 602 after depositing carbon overcoat 904 on the polished top surface of recording layer 606 according to step 508 of the method of FIG. 5 in an exemplary embodiment. After depositing carbon overcoat 904, top surface 614 of recording layer 606 becomes an interfacial layer between carbon overcoat 904 and recording layer 606. During the deposition process, carbon overcoat 904 grows on top of recording layer 606, and therefore has a smoother surface to form on due to the plasma polishing process. Therefore, top surface 906 of carbon overcoat 904 is likewise smoother. A smooth carbon overcoat 904 improves the clearance between a read/write head (not shown) and top surface 906, and improves the read signal generated in the head by disk 602. During clearance testing, the inventors found that plasma polishing the media resulted in a clearance improvement from 8 nanometers to 8.5 nanometers over standard fabrication processes that did not include plasma polishing. The inventors further found that that standard fabrication processes for a magnetic disk (i.e., that did not use the plasma polishing process described herein) resulted in a carbon overcoat surface roughness of about 6.9 Angstroms and a magnetic layer/carbon interfacial roughness of about 8 Angstroms. The surface roughness and interfacial roughness were determined by X-ray reflectivity. Similar tests were performed on media that was plasma polished. Both the carbon overcoat surface roughness and the magnetic layer/carbon interfacial roughness were about 5.1 Angstroms, which are less than what were found for the standard fabrication process.

A smoother carbon overcoat 904 allows fabricators to make carbon overcoat 904 thinner, because the corrosion resistance of disk 602 is improved. When carbon overcoat 904 is thinner, the magnetic spacing between the read/write head and recording layer 606 is reduced. The reduction in the magnetic spacing allows for improved read/write performance when disk 602 is part of a disk drive system. During testing, the inventors found that standard fabrication processes for a magnetic disk (i.e., that did not use the plasma polishing process described herein) resulted in a corrosion product for a 28 Angstrom thick carbon overcoat of about 3.6 nanograms. The amount of the corrosion product was determined by measuring a Co (cobalt) extraction count. Similar tests were performed on media that was plasma polished. A plasma polished 28 Angstrom overcoat sample resulted in a 0.5 nanogram Co extraction count, which is significantly improved over the standard fabrication process. A 22 Angstrom thick overcoat was also fabricated with the plasma polish process. Testing revealed that the Co extraction count for the sample was 0.8 nanograms. Therefore, even though the carbon overcoat in the 22 Angstrom sample was thinner, plasma polishing of the media resulted in a corrosion resistance improvement from 3.6 nanograms to 0.8 nanograms over the standard fabrication process.

Although specific embodiments were described herein, the scope of the invention is not limited to those specific embodiments. The scope of the invention is defined by the following claims and any equivalents thereof.

We claim:

1. A method of fabricating a magnetic recording disk, the method comprising:
    depositing a cap layer that is exchange coupled to a magnetic recording layer of the magnetic recording disk;
    polishing a top surface of the cap layer utilizing a plasma formed by a noble gas to smoothen the top surface of the cap layer; and
    depositing a protective carbon overcoat on the polished top surface of the cap layer to a thickness of less than 22 angstroms, wherein the protective carbon overcoat has a Cobalt extraction count of less than 0.8 nanograms.

2. The method of claim 1 wherein polishing the top surface of the cap layer further comprises:
    applying a negative bias voltage to the cap layer during the polish process which generates an electric field accelerating positive ions toward the cap layer.

3. The method of claim 2 wherein the bias voltage is a Direct Current (DC) voltage between −400 and −600 volts relative to a sputter shield.

4. The method of claim 1 wherein polishing the top surface of the cap layer is carried out in a DC magnetron station.

5. The method of claim 1 wherein the noble gas comprises one or more of Argon, Krypton, and Neon.

6. The method of claim 1 wherein polishing the top surface of the cap layer reduces a roughness of the protective carbon overcoat to 5.1 angstroms.

7. The method of claim 1 wherein polishing the top surface of the cap layer reduces an interfacial roughness between the cap layer and the protective carbon overcoat to 5.1 angstroms.

8. The method of claim 1 wherein polishing the top surface of the cap layer further comprises:
    applying a negative bias voltage to the cap layer; and
    supplying a flow of noble gas proximate to the magnetic recording disk.

9. The method of claim 8 wherein a pressure of the noble gas proximate to the magnetic recording disk is 30 millitorr.

10. The method of claim 9 wherein a flow rate of the noble gas is higher than 40 Standard Cubic Centimeter per Minute (SCCM).

* * * * *